March 22, 1966  J. S. KURTZ  3,242,008
EGG DRYING METHOD AND APPARATUS
Original Filed Nov. 13, 1962  3 Sheets-Sheet 1

INVENTOR.
JOHN S. KURTZ
BY
ATTORNEYS

March 22, 1966  J. S. KURTZ  3,242,008
EGG DRYING METHOD AND APPARATUS
Original Filed Nov. 13, 1962  3 Sheets-Sheet 2

INVENTOR.
JOHN S. KURTZ
BY
ATTORNEYS

March 22, 1966 J. S. KURTZ 3,242,008
EGG DRYING METHOD AND APPARATUS
Original Filed Nov. 13, 1962 3 Sheets-Sheet 3
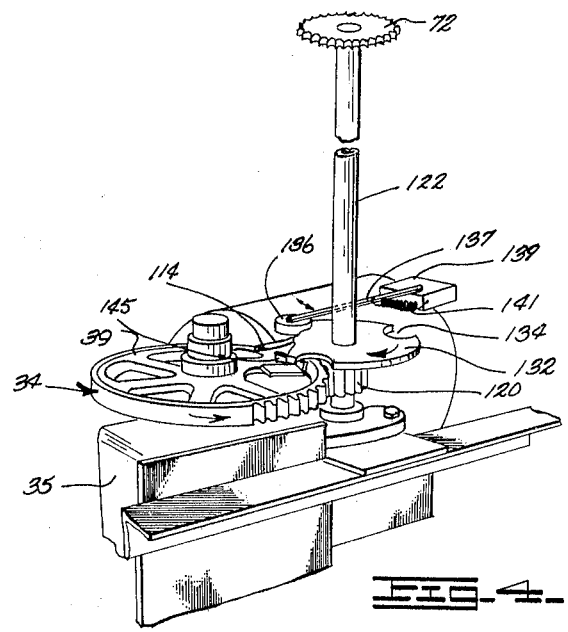
FIG-4-
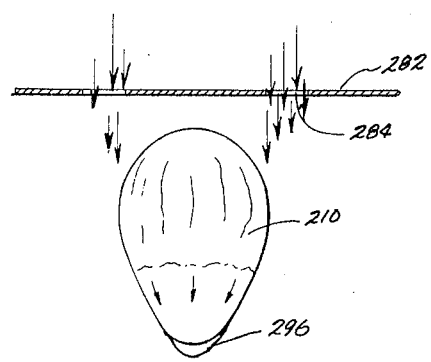
FIG-6-
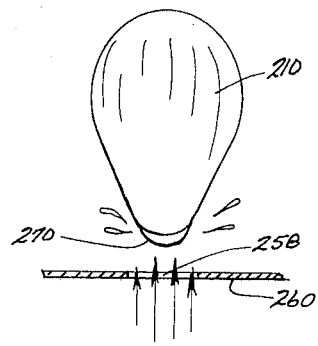
FIG-5-
INVENTOR.
JOHN S. KURTZ
BY
ATTORNEYS United States Patent Office 3,242,008
Patented Mar. 22, 1966

3,242,008
EGG DRYING METHOD AND APPARATUS
John S. Kurtz, Ephrata, Pa., assignor to Big Dutchman, Inc., a corporation of Michigan
Original application Nov. 13, 1962, Ser. No. 236,932. Divided and this application Aug. 17, 1964, Ser. No. 395,351
4 Claims. (Cl. 134—37)

This application is a division of application Serial No. 236,932 filed November 13, 1962.

This invention relates to egg washing equipment, and more particularly to an egg washing and drying apparatus for washing and drying eggs on filler flats, in a continuous fashion, by progressive stages, at successive stations along a conveyor track, using unique flow control of the washing water jets and of the drying air streams.

The difficulty experienced with presently available egg washing and drying equipment for washing eggs in filler flats is the relatively ineffective and inefficient water removal and drying action. The water on the surface of the eggs normally tends to move to the lower tip of the the egg by gravity and by downwardly directed air streams. It collects there in the form of a large drop. If air is blown from beneath the eggs as well as from above, the two air flow streams ordinarily collide adjacent the egg and in effect neutralize each other, to a slow moving, semi-stagnant state. This renders the air around the eggs largely ineffective for drying.

It is an object of the invention to provide a unique drying section with progressive drying steps. The drying air jets are directed from above and below the trays, but do not collide and neutralize each other even through flowing in opposite directions.

It is also an object of this invention to provide an egg drying apparatus including conveyor means adapted to support trays of wet eggs, where successive air streams effectively remove water from around the sides of the eggs and also effectively remove water drops from the lower ends or tips of the eggs without air stream interference.

These and other objects of this invention will be apparent upon studying the following specification in conjunction with the drawings in which:

FIG. 4 is an enlarged perspective view of the mechanical timing device causing the intermittent movement and dwell of the conveyor and carriers;

FIG. 5 is an enlarged side elevational view illustrating the first and third steps of the progressive drying stages; and FIG. 6 is a side elevational view illustrating the second step of the progressive drying stages.

Figure 1:
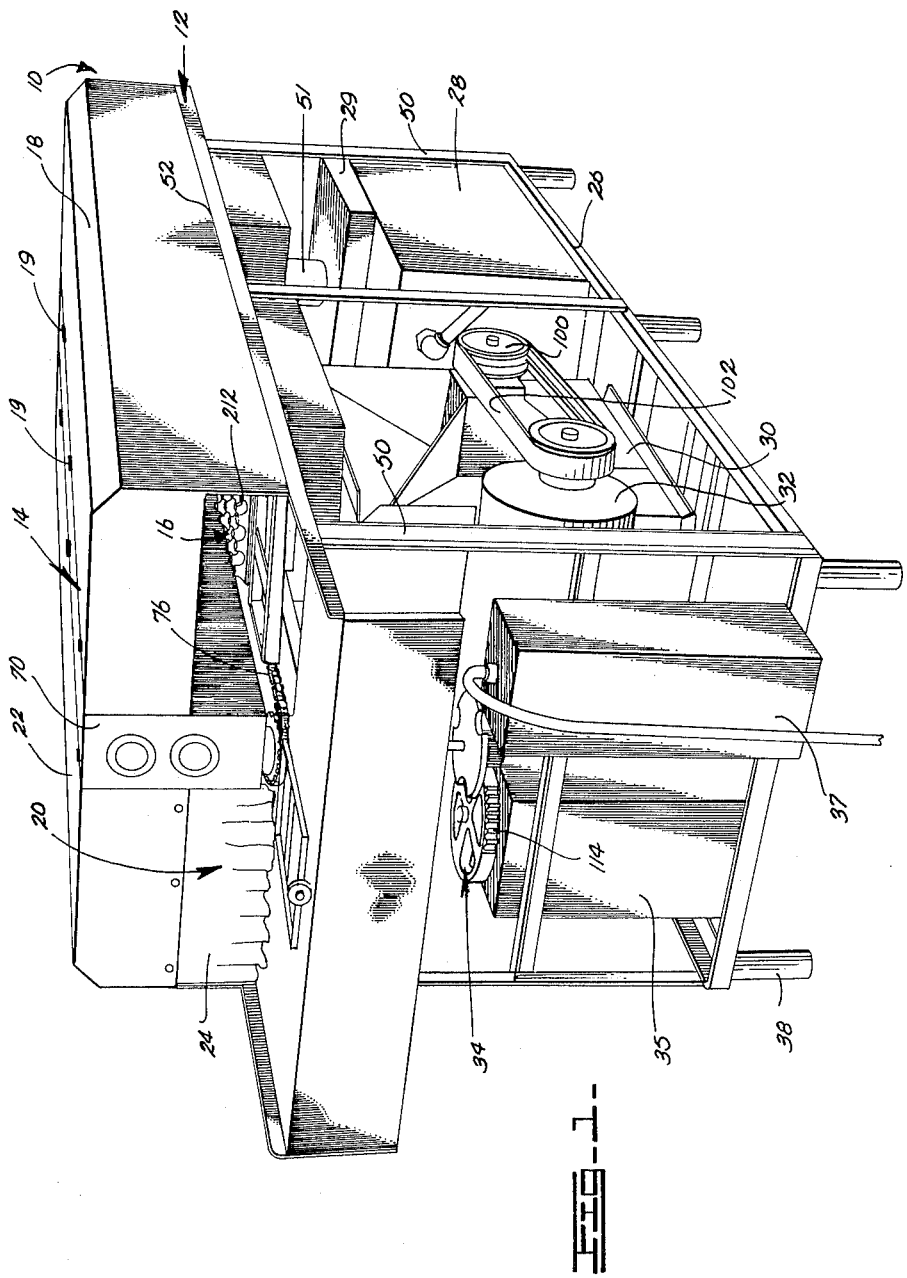
FIG. 1 is a perspective view of the novel egg washing and drying apparatus.

Basically, the egg washing apparatus comprises a continuous conveyor drive means including a plurality of open frame carriers moving along an endless track and adapted to carry trays of eggs past washing stations and drying stations, with each of a plurality of washing stations including a group of unidirectional spray nozzles mounted above or below the track to first wash the eggs from above to remove the main part of the dirt, then spray the bottoms of the eggs through openings in the filler flats after the spray from above has been stopped, and then preferably to subsequently rinse the eggs by spray from above again. Preferably, the groups of spray nozzles above and below the track are mounted successively and generally alternately along the track with no overlapping to enable optimum washing conditions without significant water jet collision from opposite directions. A timer and control means operates the conveyor in an intermittent fashion to move the carriers between the stations and stop them exactly at each station for a predetermined time interval.

After washing, the conveyor and carrier elements carry the trays of eggs through a drain space and then above the first group of drying air jets from a manifold mounted below the track and trays. The conveyor then stops. The air jet outlets from the first manifold are spaced and located to blow air streams directly onto the bottom tips of the eggs to blow off the large drops accumulated from the drain period after washing. Then the tray and eggs move beneath the second group of air outlets which are spaced and located to blow air streams down between the rows of eggs in the tray and around the sides of the eggs to actually wipe or push water from the sides of the eggs to the bottom of the eggs where it partially is drained off and partially collects in drops. Then the carriers move to and stop at the third group of air jets from a manifold mounted beneath the track with the outlets positioned and spaced to blow air directly onto the lower tips of the eggs again to blow off the drops collected thereon. These air streams from above and below occur successively in time to prevent collision of air and dampening of the air flow from both directions. As the timer and conveyor holding means stops each carrier at the successive drying stations for a predetermined time period, following carriers are stopped at the washing stations for the same time periods.

Referring now specifically to the drawings, the egg washer apparatus 10 comprises a support frame 12, an enclosing housing 14, egg washing section 20 enclosed by a hood 22 and flexible curtains 24, and an egg drying section 16 enclosed by a hood 18.

The framework 12 of suitable angle iron or the like forms a lower mounting platform 26 upon which is mounted water reservoir 28, air blower 30, electric motor 32, electrical control box 37, and conveyor drive mechanism 34 including gear box 35. This platform is supported on a plurality of legs 38. Extending upwardly from this lower platform is a plurality of vertical skeletal supports 50 upon which a second upper platform means 52 is mounted.

Figure 2:
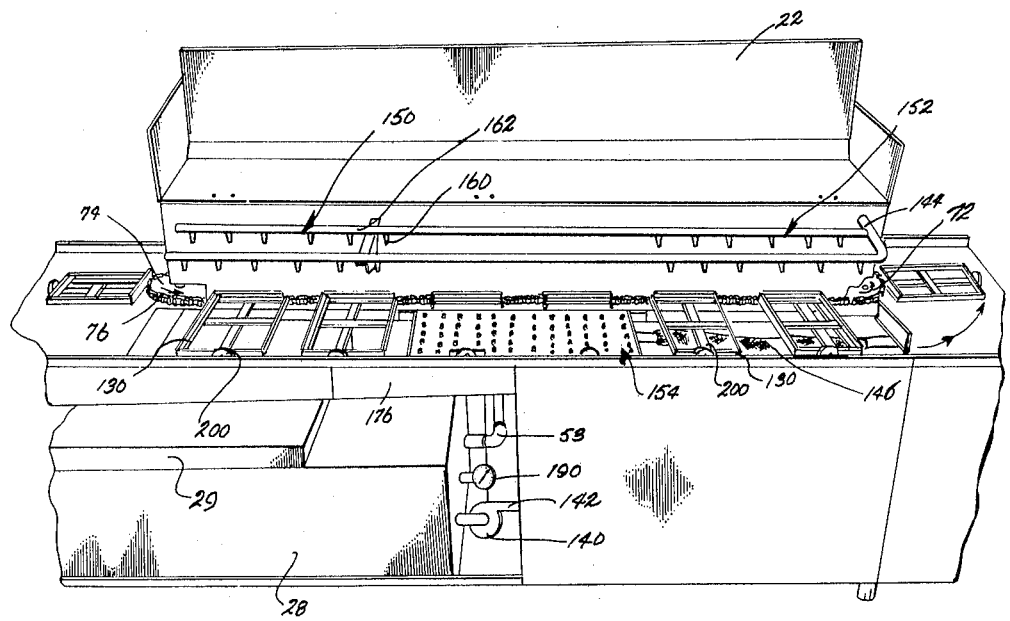
FIG. 2 is a side prespective view of the washing section of the egg washing apparatus with the covering hood shown in a raised position.

In FIG. 2 the washer section of the apparatus is illustrated with hood 22 lifted. Each of these hoods 18 and 22 is pivotally mounted on hinges 19 to the central rigid housing section 70. Section 70 encloses the two end sprockets 72 and 74 which drive the endless chain 76 of the conveyor means.

All operative components of the washing and drying apparatus are driven from electric motor 32. Covers 51 (FIG. 2) normally hide both sides of the driving mechanism, but are shown removed in FIGS. 1 and 4. Motor 32 drives pulleys 100 by V-belts 102 to operate blower 30. It also drives gear box 35 which drives timing mechanism 34. Constantly rotating timer gear 39 has teeth 114 over only a small arcuate portion of its periphery. Thus, once each revolution, gear 39 meshes with and rotates spur gear 120 which rotates shaft 122 and sprocket 72 to drive chain 76. After teeth 114 pass spur gear 120, the spur gear becomes idle again to cause a dwell time in the conveyor mechanism until the teeth mesh again. In order to assure that the conveyor chain and thus the plurality of open frame carriers 130 attached to the frame are in exactly the proper positions under or over the water or air jets during each dwell period, a holding device comprising a cam disc 132 having arcuate notches 134 at spaced intervals around its periphery, cooperates with a cylindrical cam follower wheel 136. The disc is fixedly attached to gear 120 and shaft 122. The follower 136 is attached to an arm 137 which is pivotally mounted at its other end to a suitable support 139. The wheel follower is biased by spring 141 into engagement with disc 132 and notches 134. Fixedly mounted to the wheel follower 136 is an abuttment finger 143. Fixedly mounted to timing gear 39 is a contact arm 145 adapted to engage finger 143 just prior to meshing of teeth 114 with gear 120, to shift wheel 136 against its bias, out of notch 134 to allow gear 120, ram disc 132 and shaft 122 to rotate. As teeth 114 cease to mesh with continued rotation of gear 39, wheel 136 has rolled along the cylindrical periphery of disc 132 and is biased into the next notch 134. It thus holds the disc from rotating during the dwell period and prevents the carriers from becoming misaligned with the dwell stations during successive washing and drying stages. Thus the conveyor mechanism operates by this mechanical timer and holding mechanism on a movement-dwell-movement-dwell, intermittent fashion, with the carriers held exactly aligned in the dwell periods.

Motor 32 also operates a pump 140 (FIG. 2) which pumps water from reservoir 28 through pipe 142 to both of the tubes 144 and 146 to the upper and lower water spray nozzles. The spray nozzles are located in a plurality of groups, here shown to be three, with two upper groups of nozzles 150 and 152 and one lower group of nozzles 154 spaced between the upper groups. These operate in an alternate successive fashion along the conveyor path. The spray devices may assume a variety of forms and here are shown in the upper groups to comprise nozzles 160 affixed directly to a pair of spaced parallel elongated conduits 152 such as copper pipe. The lower nozzles are greater in number, more closely spaced, and cause a more concentrated stream flow to obtain effective penetration through the perforated plastic filler flats to the eggs. These lower nozzles may be mounted on a pressure manifold 170 connected to pipe 146.

Water sprayed from these nozzles collects in trough 176 and flows through a down spout 51 (FIG. 1), through suitable screen or other filtering means in housing section 29, and thence into liquid reservoir 28. An overflow outlet 53 may be provided for reservoir 28 if desired. A suitable electrical heater means in the reservoir 28 maintains the washing water at the desired temperature indicated on gauge 190. It will be noted (FIG. 2) that each upper or lower group of nozzles is actually composed of two separate stations with each station being substantially the width of one of the carriers 130 each of which supports one filler flat 212 or egg tray with its respective eggs 210 thereon.

Each carrier comprises a suitable framework which is open i.e. skeletal in nature to allow substantially uninhibited water spray upwardly and downwardly therethrough. The sides of the carrier maintain the position of the filler flat. The framework may be substantially rectangular in configuration with suitable tie members across the bottom center thereof to support the bottom of the filler flats. The inner end of each carrier is removably attached to chain 76 while the outer end includes an idler wheel 200 which rolls along the conveyor track in a circuitous endless fashion from the loading and unloading location adjacent sprocket 74, past the washing side, around the draining end, past the drying side, and back to the unloading location. The timer and holding mechanism 34 causes the conveyor to move carriers 130 from station to station, with a dwell period exactly under the nozzles for a predetermined time at each station. Thus, each carrier 130 dwells under each of the two stations in nozzle group 150, dwells under each of the two stations in group 154, and then dwells under each of the two stations in group 152, before passing around the end and back through the drying side of the apparatus. Thus, in group 150, the main dirt is washed from the eggs by the unidirectional spray or water jets downwardly onto the eggs. Subsequently, water is sprayed upwardly through the perforated plastic trays onto the bottom of the eggs to clean the lower portions thereof. The spray is directed upwardly after the spray is directed downwardly, and not simultaneously therewith, so that effective scrubbing action is had by each independent spray means without interference from oppositely moving spray. Next, the carriers with the trays of eggs move on to the group 152 where they are rinsed by downward spray again. The nozzle groups are all spaced longitudinally from each other along the conveyor track in the preferred form of the invention, to achieve the timed alternate progressive washing action from above and below in the optimum manner.

Figure 3:
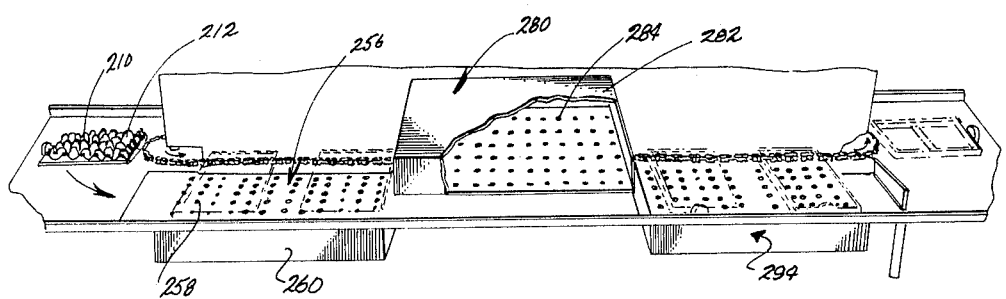
FIG. 3 is a perspective view of the drying section of the egg washing apparatus.

The dryer section 16 of the apparatus is on the opposite side as the washing section. The dryer section dries eggs in a progressive manner, preferably with three groups of air jets. It first blows from below directly onto the eggs to blow off the water drops collected at the bottom of the eggs due to drainage, then from above and between the eggs to blow the remaining water on the sides of the eggs to the bottom, and then from beneath the eggs to remove the collected water drops from the blow down stage. More specifically, as the eggs 210 in the perforated plastic filler flats 212 move around the apparatus in the direction illustrated by the arrows in FIGS. 2 and 3, the driving mechanism first moves each tray over the first group 256 of air jets blowing upwardly. These jets are formed by orifices 258 in the sheet metal manifold 260 supplied with air by blower 30. It will be noted that in the first manifold, there are five orifices in each cross row of the manifold. These coincide directly with the five eggs in the filler flat 212 so that the air jets will flow directly onto the bottom tips of each of the eggs. Obviously, with larger or smaller filler flats, the arrangement of openings in the manifold will vary to suit the particular position and spacing of the eggs. The important feature is that the air blow directly on the bottom tip of the egg as illustrated in FIG. 5 of the drawing. As the air blasts through the opening 258 in manifold 260, it blows directly against the large drop of water 270 which has collected by gravity drainage from the washed egg as it rounded the curve from the washing side of the mechanism. This substantially removes the water in droplet form. It will be noted that each carrier and thus each tray of eggs goes through two successive dwell stations on the first group of orifices. Next, the carriers move through two successive stations under the second group 280 of orifices which are formed in the bottom surface of manifold 282 mounted above the conveyor track and tray. Here it will be noted that each cross row of orifices includes six openings 284 which are spaced and positioned to blow between and around the sides of each of the five eggs in each row. The air blowing down around the sides of the eggs physically wipes or pushes any remaining water down off the sides and top. Part of it becomes evaporated and part collects in another droplet at the bottom of the egg. This is illustrated in FIG. 6. It should also be noted that the longitudinal spacing of orifices 284 is substantially smaller so that the air blows down the front and back sides of each egg as well as the laterally positioned sides to provide a complete peripheral water wiping action. Next, the carriers move over the third group of air jets 294 similar to the first group 256. This group, with its two stations, is mounted below the track and has its orifices equal in number and spacing to the eggs in the filler flat so that the air jets blow directly upon the bottom droplet 296 on each egg to blow this droplet off and completely dry the egg. This unique drying action has been found to be very effective and very efficient, both because of the progressive action directly against the bottom of the egg, then on the top and around the sides of the eggs, and then directly on the bottom of the eggs, and also because of successive air flow from only above or below with no collision of the air streams from above and below to neutralize the drying action of the air streams moving rapidly by the eggs.

It has been found with use that the washing and drying apparatus devised work very effectively even though the eggs are contained in filler flats. During operation, the operator stands at the left side of the apparatus as viewed viewed in FIG. 2 and places the trays or filler flats 212 full of dirty eggs 210 on the carriers 130 as they pass. The carriers move to the successive stations with a dwell time at each station under the three successive washing groups 150, 154 and 152, then pass around the opposite end where they dwell temporarily while the water drains down. As previously stated, this water that is drained down into the bottom tip of the egg is blasted off in the first drying group of air jets 256, after which the water is blown down around the top and sides at 280, and the second droplets are blown off the bottom of the eggs at 294. The clean eggs then appear back at the operator's position where he unloads them and reloads the carriers with more dirty eggs.

Various advantages not specifically recited above will readily occur to those in the art. Also, various modifications of the apparatus within the inventive principles as taught may occur to those in the art to suit a particular situation. These obvious modifications are deemed to be part of this invention, which is to be limited only by the scope of the appended claims and the reasonably equivalent structures to those defined therein.

I claim:
1. The method of drying washed and wet eggs in rows in perforated filler flats, comprising the sequential steps of: blowing air jets only directly upwardly onto the lower tips of each of the wet eggs to blow water drops therefrom; next blowing air only downwardly between the adjacent eggs and around the sides of each egg to wipe water down off the top and sides of each; then subsequently blowing air only upwardly directly onto the bottom tips of each of the eggs, through the perforated filler flat, to again blow drops of water off the bottoms of the eggs.

2. An egg drying apparatus for drying eggs washed in trays comprising: conveyor means and track means; open structure carrier portions on said track means adapted to carry perforated trays of washed eggs; air drying jet means mounted above and below said track means; said air jet means above said track means having a number of discharge orifices greater than the number of eggs in said trays; said orifices being spaced laterally and positioned to each direct an air jet between and around the sides of the eggs in said trays to wipe water therefrom; and said air jet means below said track means having the same number of discharge orifices as there are eggs in said trays; each of said orifices being spaced and positioned to direct an air jet directly onto the lower tip of one of the said eggs to blow water drops therefrom.

3. The egg drying apparatus defined in claim 2, wherein said air jet means above said track means are longitudinally spaced along said track means from said air jet means below the track means, such that said eggs are dried by stages in a sequential process in which the air from the two said jet means is never in active opposition.

4. The egg drying apparatus defined in claim 3, further including timing means for controlling the operation of said conveyor means; said timing means arranged to stop and hold each of said carrier portions such that the eggs upon the perforated trays carried thereby remain in predetermined alignment with said discharge orifices for a predetermined time interval.

References Cited by the Examiner

UNITED STATES PATENTS

| | | | |
|---|---|---|---|
| 1,674,414 | 6/1928 | Ridley | 15—306.2 |
| 2,500,396 | 3/1950 | Barker | 134—74 X |
| 2,673,515 | 3/1954 | Johnson | 15—3.14 X |
| 2,979,746 | 4/1961 | Willsey | 15—3.13 |
| 3,044,474 | 7/1962 | Veeder | 134—73 |

ROBERT W. MICHELL, *Primary Examiner.*